US006255962B1

(12) United States Patent
Tanenhaus et al.

(10) Patent No.: US 6,255,962 B1
(45) Date of Patent: Jul. 3, 2001

(54) METHOD AND APPARATUS FOR LOW POWER, MICRO-ELECTRONIC MECHANICAL SENSING AND PROCESSING

(75) Inventors: Martin Tanenhaus; Robert McDowell; Tom Nelson, all of Orlando, FL (US)

(73) Assignee: System Excelerator, Inc., Orlando, FL (US)

( * ) Notice: Subject to any disclaimer, the term of this patent is extended or adjusted under 35 U.S.C. 154(b) by 0 days.

(21) Appl. No.: 09/080,038

(22) Filed: May 15, 1998

(51) Int. Cl.[7] .................................................. G06F 1/32

(52) U.S. Cl. ............................ 340/870.05; 340/870.11; 340/870.16; 340/870.01; 246/169 R; 713/324

(58) Field of Search ......................... 340/870.11, 870.05, 340/870.07, 870.16, 870.01; 246/169 R; 713/324

(56) References Cited

U.S. PATENT DOCUMENTS

| | | | | |
|---|---|---|---|---|
| 4,497,031 | | 1/1985 | Froehling et al. | 364/505 |
| 4,912,471 | * | 3/1990 | Tyburski | 342/42 |
| 5,068,850 | | 11/1991 | Moore | 370/449 |
| 5,160,925 | * | 11/1992 | Dailey | 340/853.3 |
| 5,317,620 | * | 5/1994 | Smith | 379/40 |
| 5,445,347 | * | 8/1995 | Ng | 246/169 R |
| 5,481,245 | | 1/1996 | Moldavsky | 340/540 |
| 5,555,276 | | 9/1996 | Koenck et al. | 375/303 |
| 5,602,749 | | 2/1997 | Vosburgh | 700/174 |
| 5,659,302 | | 8/1997 | Cordier | 340/870.11 |
| 5,801,314 | | 9/1998 | Irwin et al. | 73/786 |
| 5,842,149 | * | 11/1998 | Harrell | 702/9 |
| 5,897,606 | * | 4/1999 | Miura | 702/56 |
| 6,047,380 | * | 4/2000 | Nolan | 713/324 |

FOREIGN PATENT DOCUMENTS

| | | |
|---|---|---|
| 62-064804 | 3/1987 | (JP) . |
| 06054910 | 3/1994 | (JP) . |
| 09093207 | 4/1997 | (JP) . |
| 98/00932 | 1/1998 | (WO) . |

* cited by examiner

*Primary Examiner*—Michael Horabik
*Assistant Examiner*—Albert K. Wong
(74) *Attorney, Agent, or Firm*—Allen, Dyer, Doppelt, Milbrath & Gilchrist, P.A.

(57) ABSTRACT

A method and apparatus for low-power sensing and processing are provided. A method preferably includes collecting a plurality of sensor signals. The plurality of sensors include sensed data representative of at least shock and vibration. The method also includes converting the plurality of sensor signals into digital data, processing the digital data, generating a data communications protocol for communicating the digital data, and simultaneously and remotely detecting the generated communications protocol having the processed data to determined the occurrence of at least one predetermined condition. An apparatus preferably includes a low-power, data acquisition processing circuit responsive to a plurality of sensor signals representative of at least shock and vibration for acquiring and processing the sensed data. The data acquisition processing circuit preferably includes a plurality of data inputs, an analog-to-digital converter responsive to the plurality of data inputs for converting each of the plurality of sensor signals from an analog format to a digital format, a digital signal processor responsive to the analog-to-digital converter for processing the digitally formatted data, a data communications processor responsive to said digital signal processor for generating and processing data communications, a battery, and a power management controller at least connected to the battery, the digital signal processor, and the data communications processor for controlling power management of the data acquisition processing circuit.

31 Claims, 7 Drawing Sheets

METHOD AND APPARATUS FOR LOW POWER, MICRO-ELECTRONIC MECHANICAL SENSING AND PROCESSING

FIELD OF THE INVENTION

The invention relates to the field of data processing, and, more particularly, to the field of sensing data from one or more sources of data input.

BACKGROUND OF THE INVENTION

Generally, it is known to individually monitor selected environmental conditions or parameters such as shock, temperature, and humidity. It is also known to individually monitor various system conditions or parameters such as vibration, strain, and tilt. The monitoring of such parameters is accomplished utilizing dedicated separate autonomous monitoring devices. These individual environmental and system monitors provide an indication of the level of such parameters to which a system is exposed. The use of these dedicated and separate monitoring devices often requires that separate power sources, sensors, data recorders, and data processors be provided for each device. Accordingly, considerable redundancy exists in the hardware required for such monitoring, and these separate monitors require individual installation, maintenance, and reading. The use of these dedicated and separate devices, e.g., including reading and/or tracking of data, can be complex, costly, bulky and space consuming, and time consuming.

It is also known to combine several environmental monitoring functions into a single monitoring system. Examples of such systems can be seen in U.S. Pat. No. 5,659,302 by Cordier titled "Process For Monitoring Equipment And Device For Implementing Said Process, " U.S. Pat. No. 5,602,749 by Vosburgh titled "Method Of Data Compression And Apparatus For Its Use In Monitoring Machinery," U.S. Pat. No. 5,481,245 by Moldavsky titled "Monitored Environment Container," and U.S. Pat. No. 5,061,917 by Higgs et al. titled "Electronic Warning Apparatus." These combination monitoring systems, however, fail to provide an accurate, cost-effective, compact, and flexible system for remotely monitoring a plurality of sensors simultaneously and with a low power consumption.

For example, due to the prohibitive costs of conventional data collection methods, highway structures are monitored at intervals measured in years. In other words, the failure to provide an accurate, cost-effective, and flexible system for monitoring a highway structure makes data related to the structure or device difficult and/or cost prohibitive to obtain. Such information or data, however, can be quite valuable to evaluation and monitoring of the structure.

SUMMARY OF THE INVENTION

In view of the foregoing background, the present invention advantageously provides a method and apparatus for accurately, compactly, and flexibly remotely monitoring a device by the use of a plurality of sensors such as shock, vibration, and at least one other such as temperature, tilt, strain, or humidity simultaneously and with a low power consumption. The present invention also provides a method and apparatus for reducing inspection costs and also creates new monitoring capabilities not possible or not available for various types of systems. The present invention additionally advantageously provides a method and apparatus for making rapid, reliable, and timely readiness measurements of a broad range of systems desired to be monitored such as missiles, missile launchers, missile support systems, highway bridges, operating machinery, transportation, or telemetry systems. The present invention further advantageously increases reliability, readiness, flexibility, and safety and greatly reduces maintenance time, labor, and cost for monitoring various types of systems. For example, the apparatus advantageously can readily be expanded for additional types of sensors which may be desired on various selected applications.

More particularly, the present invention provides a method of monitoring a device comprising the steps of collecting a plurality of sensor signals representative of sensed data from a plurality of micro-electrical mechanical sensors ("MMEMS") The plurality of micro-electrical mechanical sensors generate sensed data representative of at least shock, vibration, and at least one other parameter. The method also includes converting the plurality of sensor signals into digital data, processing the digital data, and simultaneously and remotely detecting the processed data to determined the occurrence of at least one predetermined condition. The method can also include sensing an initial wake-up condition prior to the step of collecting the plurality of sensor signals.

The present invention also includes an apparatus for monitoring a device. The apparatus preferably includes a plurality of micro-electrical mechanical sensors positioned to sense a plurality of parameters including at least shock, vibration, and at least one other parameter and to provide a corresponding plurality of sensor data signals representative of the plurality of monitored parameters. The apparatus additionally preferably includes a low-power, data acquisition processing circuit responsive to the plurality of sensor signals for acquiring and processing the sensed data. The low-power, data acquisition processing circuit includes a plurality of data inputs, an analog-to-digital converter responsive to the plurality of data inputs for converting each of the plurality of sensor signals from an analog format to a digital format, a digital signal processor responsive to the analog-to-digital converter for processing the digitally formatted data, a data communications processor responsive to the digital signal processor for generating and processing data communications, a battery for providing portable power to the data acquisition processing circuit, and power management controlling means at least connected to the battery, the digital signal processor, and the data communications processor for controlling power management of the data acquisition processing circuit. The apparatus advantageously further includes a remote detector responsive to the data acquisition processing circuit for remotely detecting the processed digital data. The apparatus also can advantageously include at least one wake-up sensor circuit connected to the low-power, data acquisition processing circuit for sensing an initial wake-up condition to thereby wake-up the low-power, data acquisition processing circuit from a sleep-type low power condition.

The present invention further provides an apparatus for low-power, data acquisition processing responsive to a plurality of micro-electrical mechanical sensors. The apparatus preferably includes a plurality of data inputs, an analog-to-digital converter responsive to the plurality of data inputs for converting each of the plurality of sensor signals from an analog format to a digital format, a digital signal processor responsive to the analog-to-digital converter for processing the digitally formatted data, a data communications processor responsive to the digital signal processor for generating and processing data communications, a battery for providing portable power to the data acquisition processing circuit, and power management controlling means at least connected to the battery, the digital signal processor, and the data communications processor for controlling power management of the data acquisition processing circuit.

Therefore, the method and apparatus advantageously provide a smart monitor which can form a node for accessing data from a device such as a structure, system, or area from which data is desired. A plurality of these smart monitors can each form a node in a data communications network capable of multi-sensor data acquisition, analysis, and assessment which perform by acquiring, storing, processing, displaying and screening field collected data from a plurality of MEMS. The apparatus preferably forms a wireless node which communicates data, e.g., both raw or unprocessed and processed data, so that the data can advantageously be used in a user friendly format such as windows-based programs of a laptop or palmtop computer.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Prime or multiple prime notation where used indicates alternative embodiments. Like numbers refer to like elements throughout.

Figure 1:
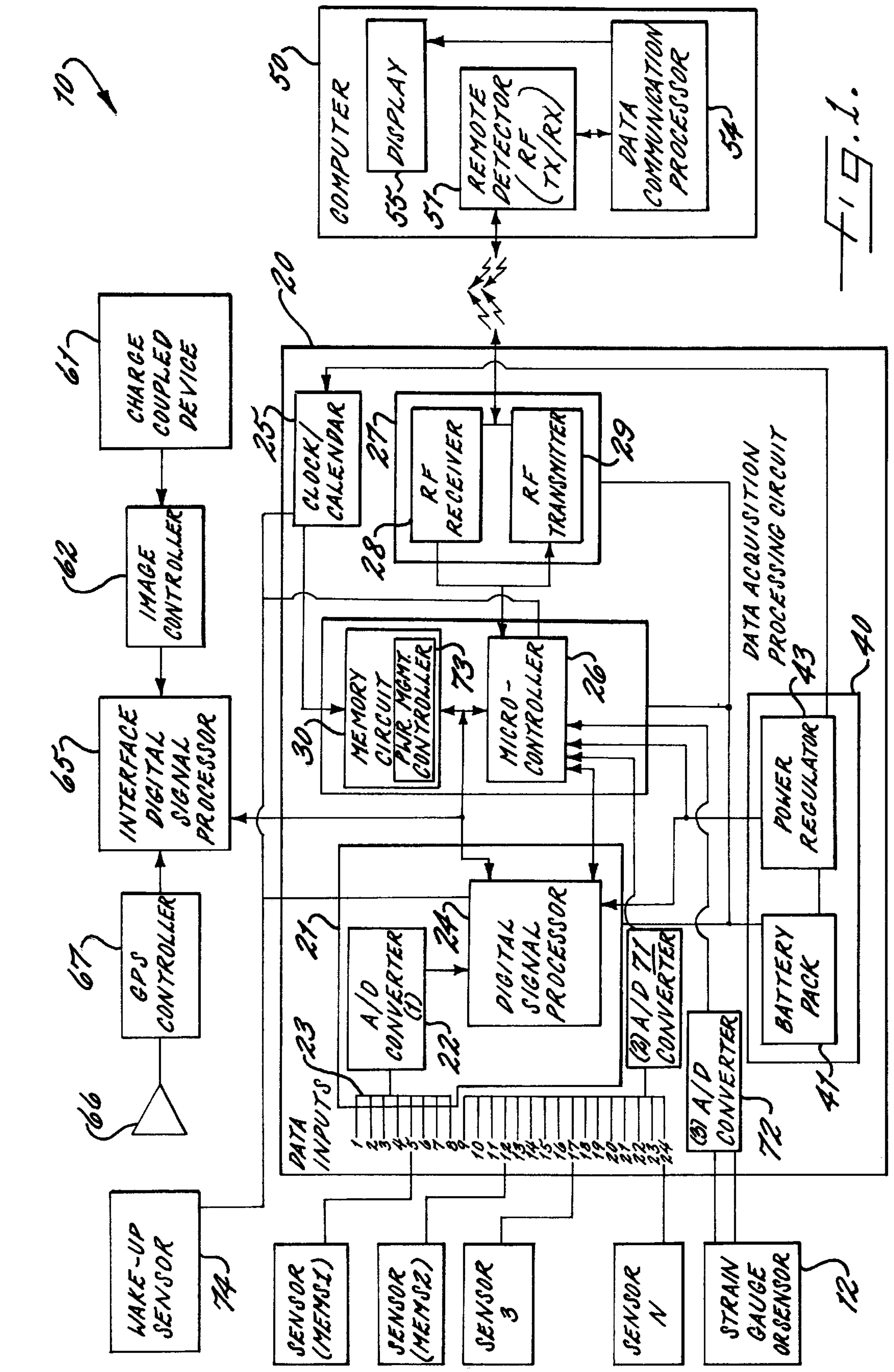
FIG. 1 is a schematic block diagram of a first embodiment of an apparatus for low-power, micro-electrical mechanical sensing and processing according to the present invention.

FIG. 1 schematically illustrates a low power apparatus 10 for monitoring a device, such as a missile, a highway bridge, a telemetry unit, machinery, or various other equipment, according to the present invention. The apparatus 10 includes a plurality of sensors MEMS 1, MEMS 2, 3, . . . N, 12, 74, and preferably at least a plurality of micro-electrical mechanical sensors ("MEMS") MEMS 1, MEMS 2, positioned to sense a plurality of parameters including at least shock and vibration and to provide a corresponding plurality of sensor data signals representative of the plurality of monitored parameters. The plurality of sensors advantageously can further sense at least one of the following: temperature, strain, humidity, acoustic, angle, magnetic field, seismic, chemical content and/or variation, and tilt. The MEMS preferably include at least one accelerometer, but a family of MEMS or other types of sensors, for example, can also include vibration, seismic, and magnetometer sensors, chemical sensors, image eye and acoustic sensors to monitor wake-up disturbances, shock, periodic vibration or movements, operating machinery vibrations, material movements, chemical content, sounds, and images by taking still pictures of the scene in real time. The plurality of sensors MEMS 1, MEMS 2, 3, . . . N, 12, 74 preferably also include a wake-up sensing circuit 74 which advantageously senses any initial activity, e.g., vibration, movement, to provide a wake-up function to a data acquisition processing circuit 20 as described further herein below.

Figure 3:
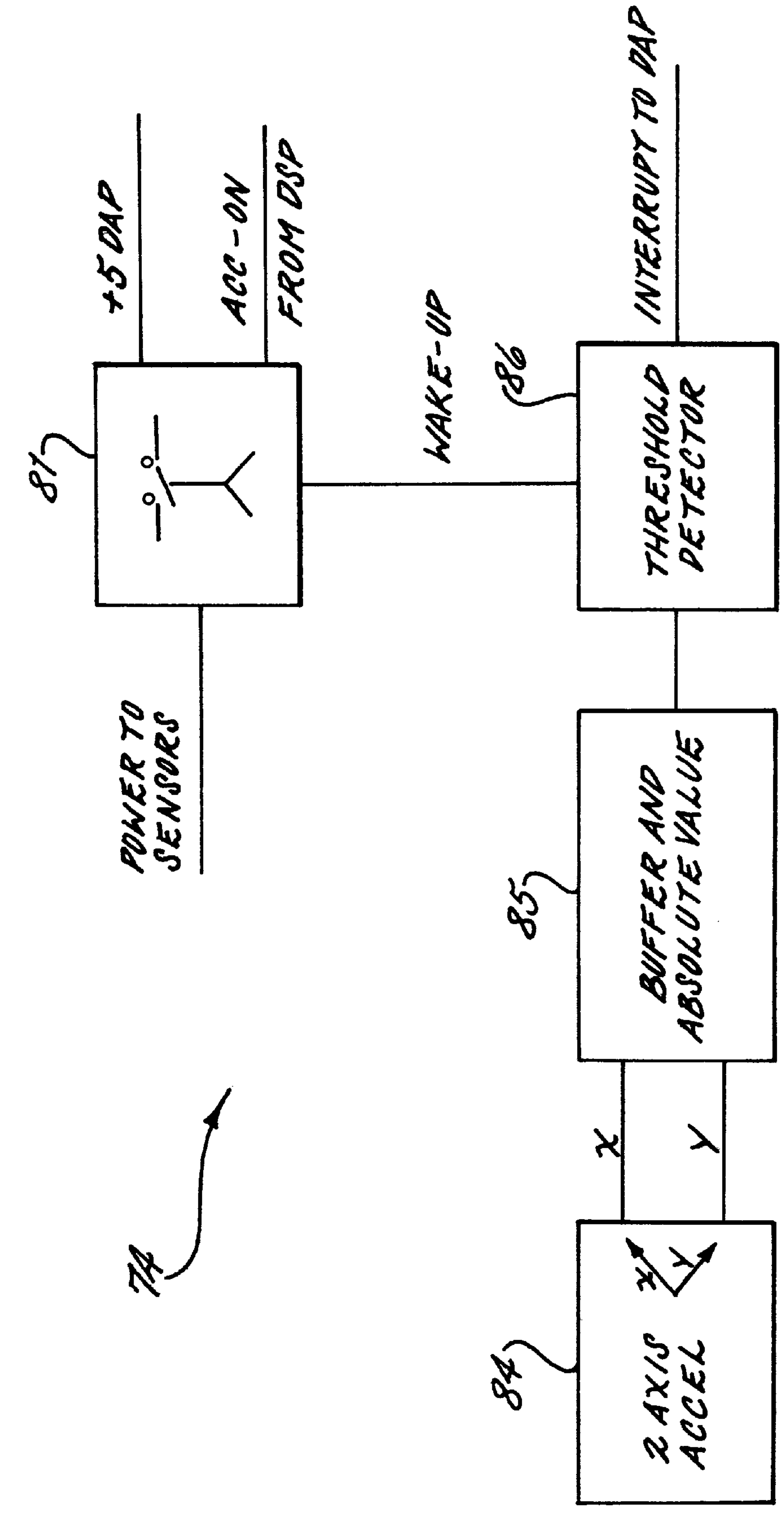
FIG. 3 is a schematic block diagram of a wake-up sensor of an embodiment of an apparatus for low-power, micro-electrical mechanical sensing and processing according to the present invention.
Figure 4:
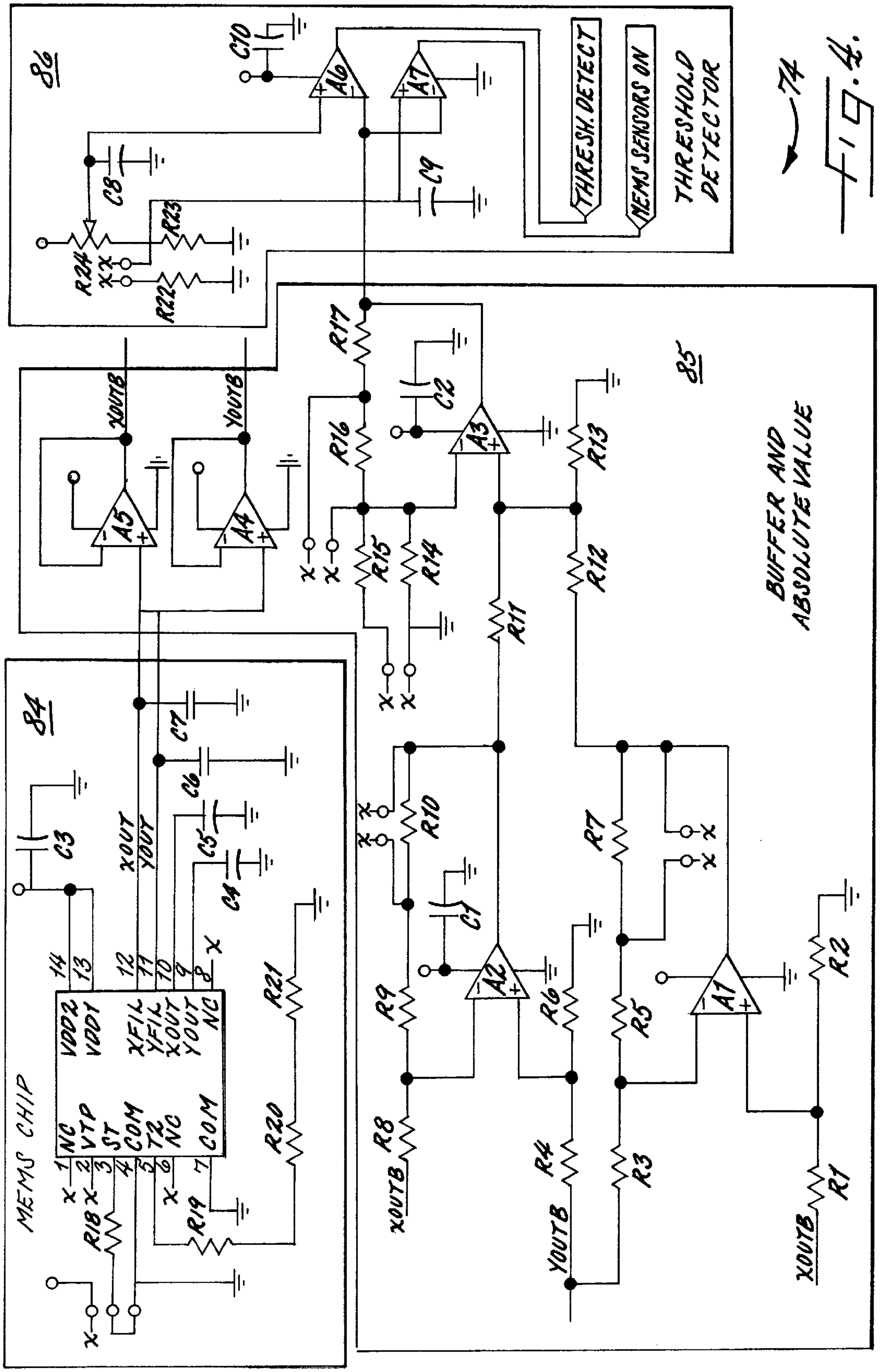
FIG. 4 is a schematic diagram of a wake-up sensor of an embodiment of an apparatus for low-power, micro-electrical mechanical sensing and processing according to the present invention.

As best illustrated in FIGS. 3–4, the wake sensing circuit 74, for example, can include a MEMS 84 which can sense data in two axes, e.g., X and Y, as illustrated for providing a sensing signal responsive to an initial wake-up condition such a vibration or movement. An example of a MEMS integrated circuit, e.g., a two-axis accelerometer as understood by those skilled in the art, connected to a plurality of resistors R18, R19, R20, R21 and a plurality of capacitors C3, C4, C5, C6, C7 is illustrated in FIG. 4 as an example of a wake-up sensor 84 for sensing the initial wake-up signal and providing the sensing signal therefrom. The MEMS is preferably connected to a buffering circuit, e.g., a buffer and absolute value circuit 85, which buffers the sensing signal and provides an absolute value for the sensed signal. An example of a buffering circuit 85 is illustrated in FIG. 4 and preferably includes a plurality of resistors R1, R2, R3, R4, R5, R6, R7, R8, R9, R10, R11, R12, R13, R14, R15, R16, R17, a plurality of capacitors C1, C2, and a plurality of amplifiers A1, A2, A3, A4, A5 or other type of driving circuitry as understood by those skilled in the art. A threshold detecting circuit 86 is preferably connected to the buffering circuit for detecting whether or when the buffered sensing signal reaches or passes a predetermined threshold value. An example of a threshold detecting circuit 86 is also illustrated in FIG. 4 and can include a plurality of resistors R22, R23, R24, a plurality of capacitors C8, C9, C10, and a plurality of comparators A6, A7 or other driving circuitry as understood by those skilled in the art. It will also be understood by those skilled in the art that instead of discrete resistor components as illustrated in the wake-up sensing circuit, one or more of the resistors, for example, also can be adjustable digital potentiometers which advantageously provide for adjustable gain to better control or adjust to receive desired or enhance circuit performance. Additionally, a switching circuit 81 is also preferably connected to the threshold detecting circuit 86 for switching the data acquisition processing circuit 20, as well as the other sensors, from a sleep-type low power condition to a wake-up higher power condition.

The apparatus 10 also includes low-power, data acquisition processing means, e.g., preferably provided by a low-power data acquisition processing circuit 20, responsive to the plurality of sensor signals for acquiring and processing the sensed data. The low-power, data acquisition processing circuit 20 includes a plurality of data inputs 23. The plurality of data inputs includes at least 8 data inputs, and more preferably includes at least 26 data inputs, connected to the analog-to-digital converter 22, 71, 72, for increased accuracy and flexibility of the data acquisition processing circuit 20. The apparatus 10 is preferably capable of capturing and processing from 8 up to 16 channels of mixed sensor data simultaneously and analyzing and summarizing the captured data.

The low power data acquisition circuit 20 preferably also includes analog-to-digital converting means, e.g., preferably provided by one or more analog-to-digital ("A/D") converters 22, 71, 72 responsive to the plurality of data inputs 23 for converting each of the plurality of sensor signals from an analog format to a digital format. The A/D converting means is preferably provided by a plurality, e.g., three, of distinct types of A/D converters 22, 71, 72 so as to implement a family of functional capabilities by the apparatus. First, for example, an 8-channel, 12-bit, programmable A/D converter (1) 22, as understood by those skilled in the art, can be used for converting sensed disturbances such as vibration and shock. The A/D converter (1) can also be a 4-channel, 12-bit A/D converter according to some embodiments of the invention (see FIG. 7) or may not be required according to other embodiments of the invention (see FIG. 8). Second, a 16-bit A/D convertor (2) 71 can be used, in addition, for converting sensed slow moving disturbances, e.g., temperature and humidity, and is preferably an analog circuit due to the desire and need for low power. Third, an A/D converter (3) 72 can be used for converting sensed data such as from a strain gauge or strain sensor. Digital signal processing means, e.g., preferably provided by a digital signal processor 24 such as a 16-bit digital signal processor as understood by those skilled in the art, is responsive to the analog-to-digital converting means 22 for processing the digitally formatted data. With the wake-up sensing circuit, the plurality of sensors, the A/D converting means, and the digital signal processor, these portions of the apparatus 10 according to the present invention can then advantageously be configured for direct data communications, if desired. These portions of the apparatus, for example, can be used in some applications where additional circuitry as described further herein is not desired.

The digital signal processor 24 advantageously includes a shock, vibration, or force profiling means, preferably provided by a software program such as a script operation as understood by those skilled in the art, for providing a shock profile of the amount of shock, vibration, or force applied to the apparatus or sensed by one of the shock sensors. The shock profiling means, more specifically, can be provided by a G-profiler which is a script that runs or operates in the digital signal processor 24. For example, after a vibration occurs, analog data supplied to the digital signal processor 24 is converted to digital data and stored in a memory portion of the digital signal processor 24. This script processes the digital data for saturation points, e.g., points where the physical limits of the MEMS sensors were exceeded. The projected data, for example, can be a predetermined value or amount such as up to 400% of the analog operating limits of the MEMS sensors.

So, by way of example, if a MEMS sensor has a 4 G rated maximum limit or saturation point, e.g., which acts as a threshold point or value, and the MEMS sensor receives a 12 G shock, then a resulting waveform for the portion exceeding the saturation point would be truncated at the saturation point for the period of time that the saturation point was exceeded. Accordingly, the G-profile provides a projection of this 12 G force even though it was not actually measured. As understood by those skilled in the art, one simple way this can be accomplished is by using the following trigonometric equation:

$$B=a\ x(c+d).$$

In this equation, B is a projected point, a is the slope (A/c) of the angle between the baseline and the rise or decline of the waveform, A is the limit or threshold value, c is the number of samples before the limit or threshold is reached, and d is ½ of the duration of the over limit or over threshold data. The A and c preferably are extracted from the digitized data. This operation is then performed on every event in the sample for the selected channel or channels from which the data is received. The maximum value calculated by the projection is then the maximum value returned or provided as an output. The user also can receive a flag or have data displayed which indicates that the threshold or limit has been exceeded and that the following data is projected data for this exceeded amount. If no events exceed the limit, then the maximum value for that channel is returned. The results are preferably provided is voltage levels, e.g., millivolts. Although other G-profiler techniques can be used as well, this example illustrates a simple technique which can advantageously be used with a digital signal processor 24 have the low power and capacity desires in these type of applications.

Additionally, the data acquisition processing circuit 20 can advantageously include data communications processing means, e.g., preferably provided by a data communications processing circuit such as at least one micro-controller 26, responsive to the digital signal processing means 24 for generating and processing data communications. The micro-controller 26, e.g., preferably provided by a 16-bit micro-controller as understood by those skilled in the art, preferably monitors the digital signal processing means 24 before and after the digital signal processing means 24 processes the digital converted data. The digital acquisition processing circuit 20 further includes data storing means connected to the digital signal processing means 24 and the at least one micro-controller 26 for storing the processed data therein until remotely accessed. The data storing means is preferably provided by a separate memory circuit 30 such as Flash/SRAM as understood by those skilled in the art. Although discrete components are illustrated, it will be understood by those skilled in the art that an ASIC can be developed as well for the various components of the data acquisition processing circuit as illustrated, including, for example, only the A/D converting means and the digital signal processing means or, in addition, the micro-controller and/or memory circuit.

The data acquisition processing circuit 20 can further advantageously include real time clocking means, e.g., provided by a real time clock/calendar circuit 25, for providing real time thereto. The data storing means, e.g., the separate memory circuit 30, of the data acquisition processing circuit 20 includes script operating means, e.g., a script operator software program 32, responsive to the real time clocking means 25 for operatively sampling the plurality of data inputs 23, processing the digital data, and analyzing the processed data at predetermined scripted real time intervals (see FIG. 2). The script operating means 32 further operatively generates a data report 33 such as for displaying on a display 55 and generates an alarm condition 34 when predetermined threshold conditions occur.

Accordingly, as described and illustrated herein, the apparatus has two basic modes of operation. In the "reporting" mode or normal mode, the unit "wakes up" and monitors the sensors either at a prearranged time or in response to an external event. For example, anytime contact is established with the apparatus, e.g., via the RF or serial link, the secondary or "real time" mode can be enabled. In the real time mode, the apparatus will respond to external commands via the RF or serial link. While in the real time mode, the apparatus can be commanded to acquire data from any of the sensors, perform calculations on the acquired data, and accept and run new scripts or instructions which can advantageously include a completely new script or set of instruction written to or communicated to the apparatus. The reporting mode can be reenabled at any time, allowing the unit to return to the "sleep" mode.

Figure 2:
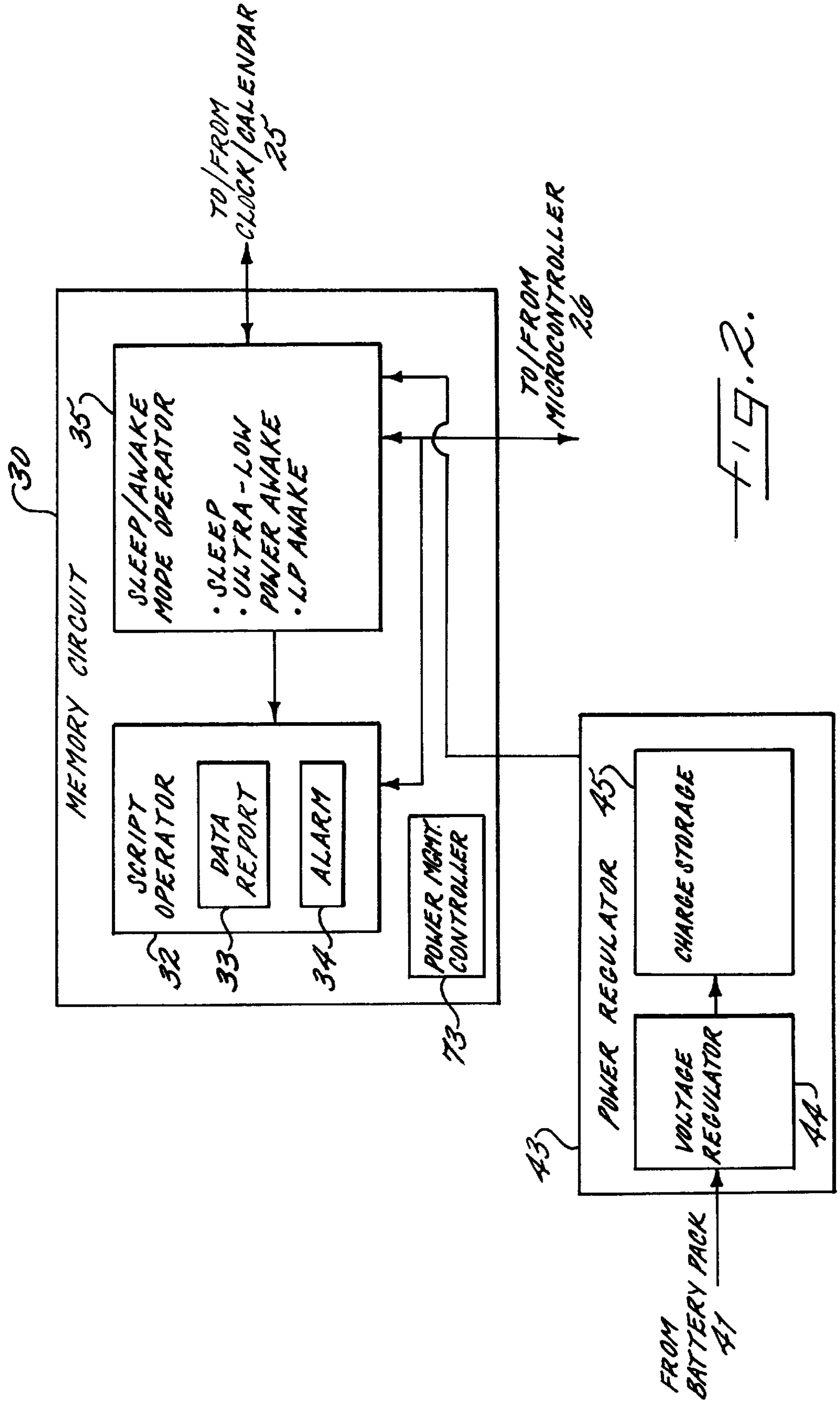
FIG. 2 is a schematic block diagram of a power management controller and a memory circuit of an embodiment of an apparatus for low-power, micro-electrical mechanical sensing and processing according to the present invention.

As illustrated in FIGS. 1–2, the data acquisition processing circuit 20 also advantageously includes a portable power source, e.g., preferably provided by one-or more batteries forming a battery pack 41, for providing portable power to the data acquisition processing circuit 20 and power management controlling means, e.g., a power management controller or control circuit 73 such as forming a portion of software in the memory circuit 30, at least connected to the portable power source 41, the digital signal processor 24, and the micro-controller 26 for controlling power management of the data acquisition processing circuit 20. The combination of the power management controller 73, the power regulator 43, e.g., preferably provided by a voltage regulator circuit 44 and a charge storage circuit 45 as understood by those skilled in the art, and the type of the portable power source 41 combine to provide means for extending the life of the portable power source during normal system operational use for at least an estimated four-year life and, more preferably, greater than five years. The portable power source 41 is more preferably provided by a battery pack which uses four Lithium DD cells and 6 Aerogel 1.0 and 7.0 Farad capacitors as understood by those skilled in the art. The data acquisition processing circuit 20 thereby operatively draws less than 200 milliamperes ("mA") of current, and more preferably less than 20 mA of current. The power management controlling means in combination with the memory circuit 30 includes at least a sleep mode, an ultra-low power awake mode, and a low-power awake mode. The power management controlling means 43 and other portions of the memory circuit 30 in combination are preferably responsive to command signals from the data communications processing means 26 at predetermined real time intervals to increase power supplied to the data acquisition processing circuit 20.

The data acquisition processing circuit 20 further includes at least one RF transmitting circuit 28 responsive to the micro-controller 26 for transmitting RF data communications and at least one RF receiving circuit 29 connected to the micro-controller 26 for receiving RF data communications. The RF transmitting circuit 28 and the RF receiving circuit 29 preferably together form a PRISM radio circuit 27 for PCMCIA 2.4 Ghz data communications as understood by those skilled in the art. Preferably, the micro-controller 26, the at least one RF transmitting circuit 28, and the RF receiving circuit 29 advantageously define at least portions of a wireless local area network ("LAN") circuit. This wireless LAN circuit can also include the separate memory circuit 30 as well.

Figure 9:
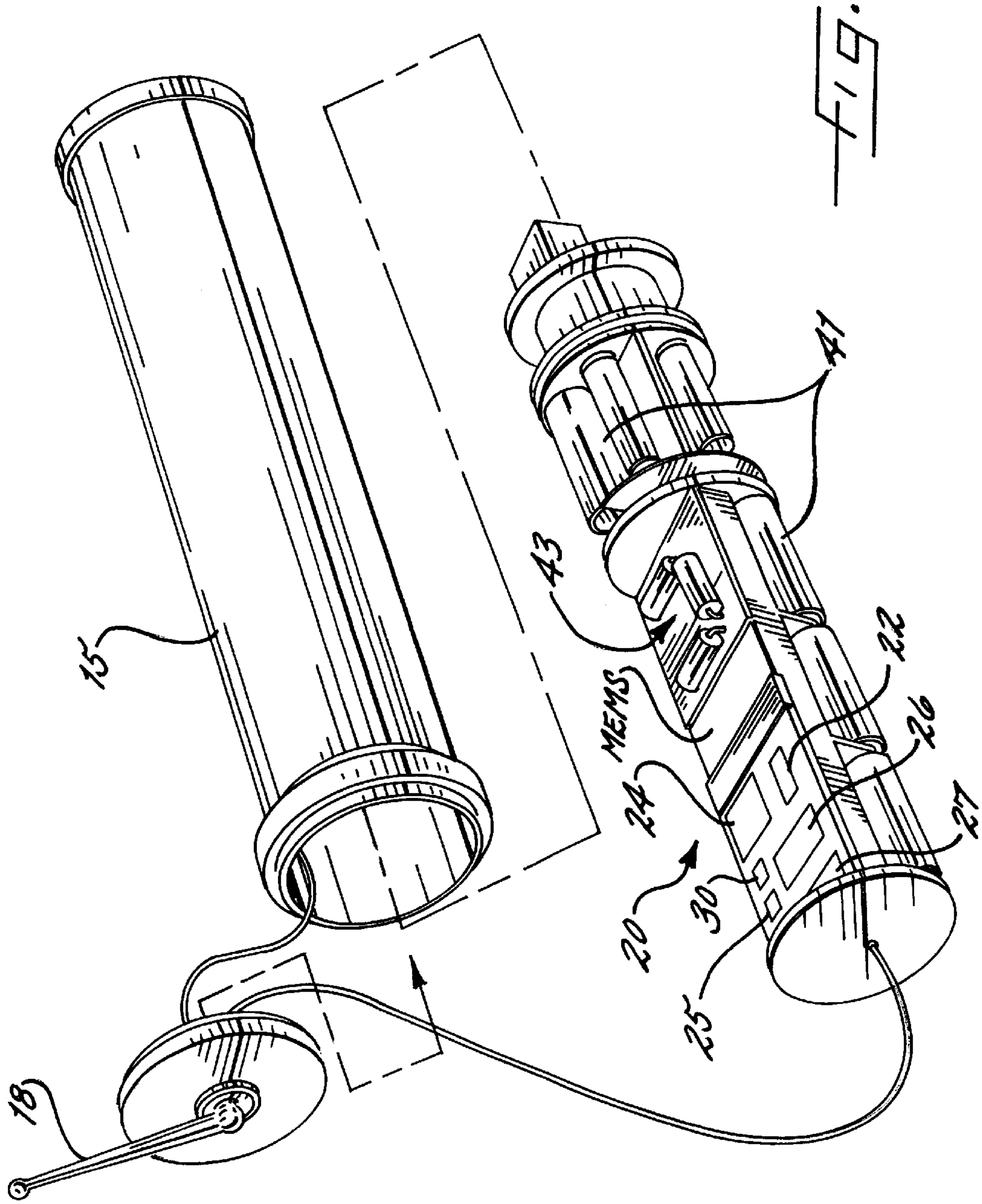
FIG. 9 is an exploded perspective view of a data acquisition processing circuit on a circuit board being positioned into a housing of an embodiment of an apparatus for low-power, micro-electrical mechanical sensing according to the present invention.

As perhaps best illustrated in FIG. 9, the data acquisition processing means 20 is preferably positioned entirely within a single, compact, and rugged housing 15 for withstanding harsh environmental conditions, e.g., various weather conditions, various moisture and heat conditions, and various sand, dirt, dust, or water conditions. The housing 15 is preferably a tubular or can-type metal structure having sealable or sealed openings therein for providing data links from the MEMS to the data acquisition processing circuit 20 and from the data acquisition processing circuit 20 to a remote device 50 which preferably includes a remote data communications detector 51. In essence, the housing 15 provides a casing for a weapons deployable and shock hardened multi-chip module which can have the data acquisition processing circuit 20 compactly potted, packed, and positioned therein.

The apparatus 10 also further preferably includes a remote data communications detector 51 responsive to the data acquisition processing means 20, e.g., through a port or antenna 18 of the housing 15, for remotely detecting the processed digital data. The remote data communications detector 51 preferably includes at least an RF receiver 52 for receiving RF data communications from the data communications processing circuit, but also preferably includes an RF transmitter 53 for transmitting data communications to the data communications processing circuit 26. Preferably, at least one computer 50 is responsive to and/or includes the remote data communications detector 51 for further processing the wireless data communications received or detected from the data acquisition processing circuit 20. The at least one computer 50 includes a display 55 for displaying unprocessed and processed data from the data acquisition processing means 20.

The apparatus 10 can also advantageously include additional features such as an image sensor 61 and image controller 62 connected to the data acquisition processing circuit for respectively sensing images and controlling imaging data. The image sensor 61 is preferably provided by a charge coupled device ("CCD") connected either directly to the data acquisition processing circuit or through an interface digital signal processor 65 to the data acquisition processing circuit 20. Additionally, a global positioning satellite ("GPS") antenna 66 and a GPS controller 67 can be connected to the data acquisition processing circuit 20, either directly or also through the interface digital signal processor 65, for providing data such as the location or position of the device being monitored over time or during travel. This GPS system, for example, can be advantageously used in military environments wherein vehicles, missiles, or other equipment travel or are shipped to various locations over time.

Figure 5:
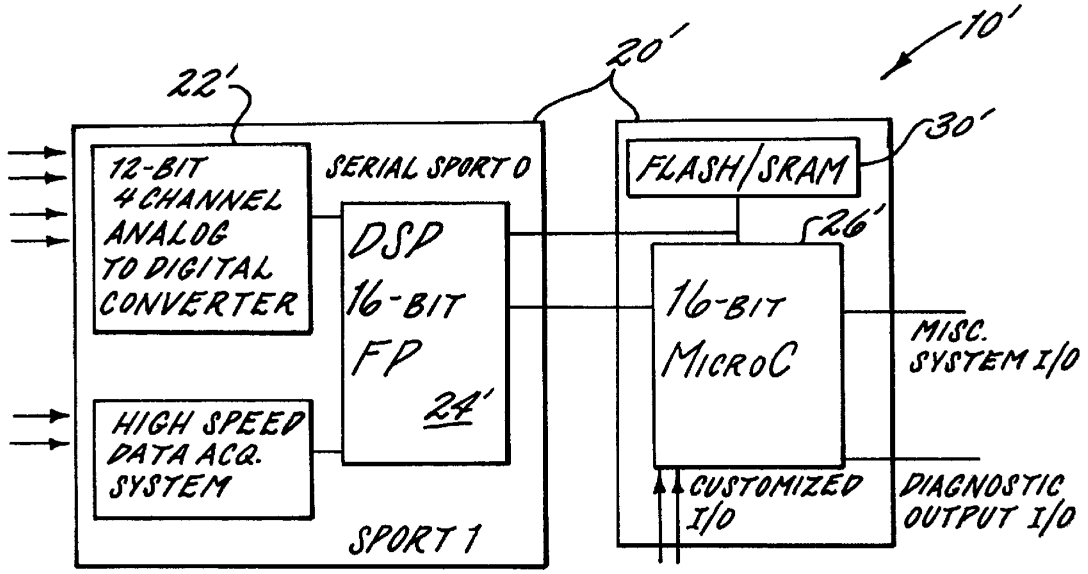
FIG. 5 is a schematic block diagram of a second embodiment of an apparatus for low-power, micro-electrical mechanical sensing and processing according to the present invention.
Figure 6:
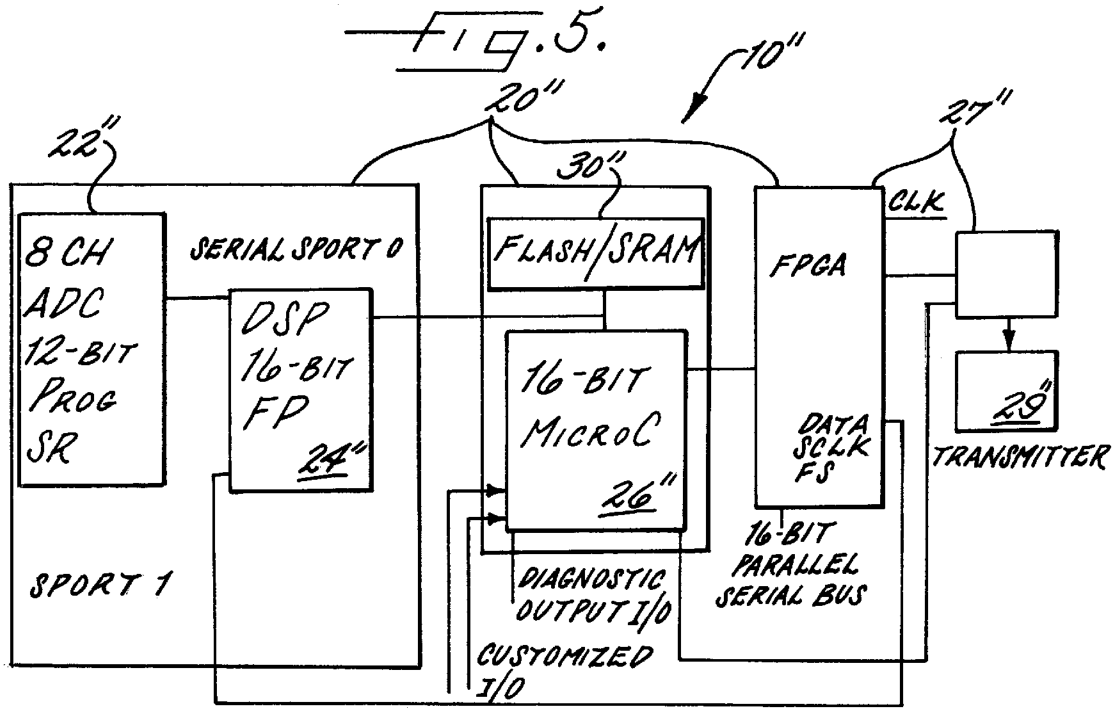
FIG. 6 is a schematic block diagram of a third embodiment of an apparatus for low-power, micro-electrical mechanical sensing and processing according to the present invention.
Figure 7:
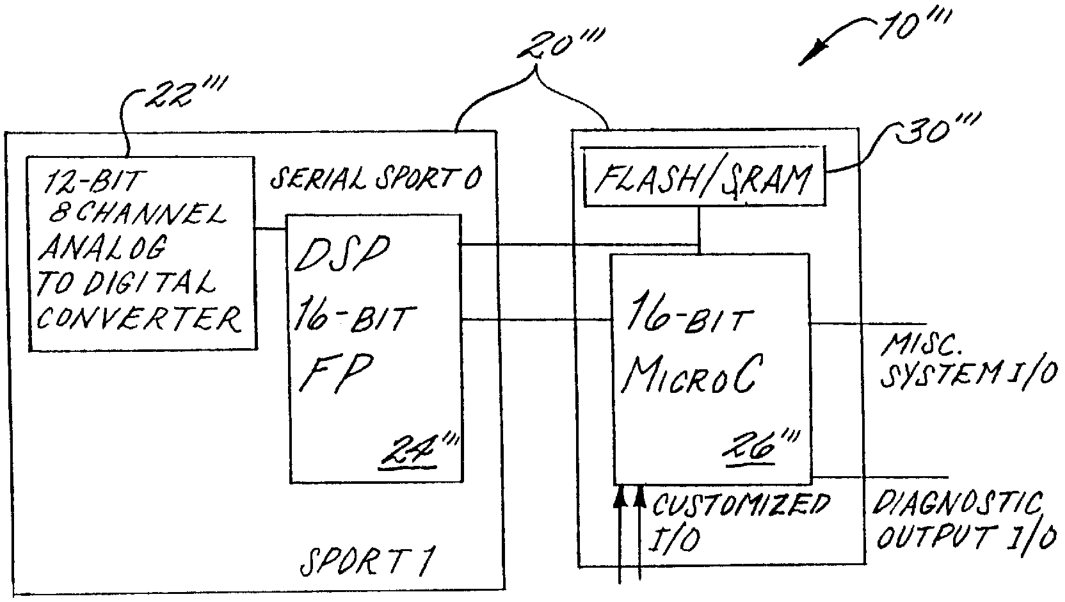
FIG. 7 is a schematic block diagram of a fourth embodiment of an apparatus for low-power, micro-electrical mechanical sensing and processing according to the present invention.
Figure 8:
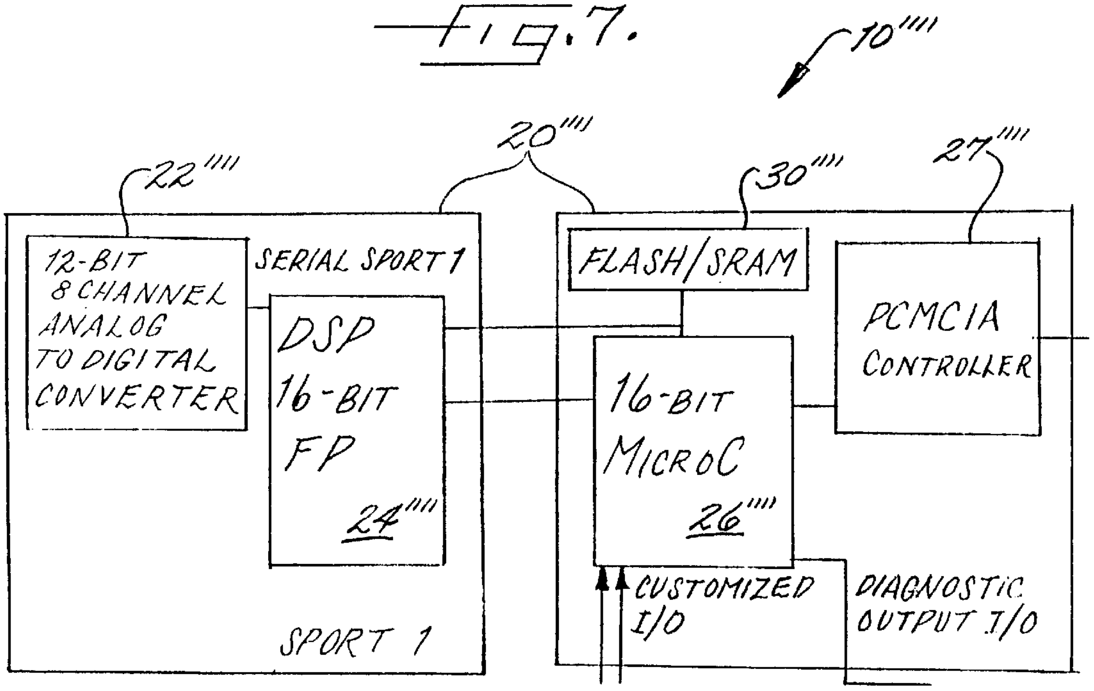
FIG. 8 is a schematic block diagram of a fourth embodiment of an apparatus for low-power, micro-electrical mechanical sensing and processing according to the present invention.

FIGS. 5–9 illustrate other embodiments of an apparatus 10', 10", 10'", 10"" for low-power, micro-electrical mechanical sensing and processing according to the present invention. FIG. 5, for example, provides an architecture or design of an apparatus 10' for a multi-event hard target fuze or smart fuze. FIG. 6, for example, provides an architecture or design of an apparatus low for a telemetry unit or other system which uses an encoder or an encoder system module. FIG. 7, for example, is an architecture or design of an apparatus 10''' for a G-hardened event as understood by those skilled in the art or data recorder which also includes a high speed data acquisition circuit. FIG. 8, for example, is an architecture of an apparatus 10'''' for vibration analysis which uses a hard-wire link for data communication instead of the wireless data link as described previously above herein.

As illustrated in FIGS. 1–9, the present invention also includes methods of monitoring a device. A method preferably includes collecting a plurality of sensor signals representative of sensed data from a plurality of sensors MEMS 1, MEMS 2, 3, . . . N, 12, 74 and more preferably at least a plurality of micro-electrical mechanical sensors ("MEMS") MEMS 1, MEMS 2. The plurality of sensors preferably generate sensed data representative of at least shock, vibration, and at least one other parameter. The at least one other parameter includes at least one of the following: temperature, strain, humidity, acoustic, angle, magnetic field, seismic, chemical content and/or variation, and tilt. The method also includes converting the plurality of sensor signals into digital data, processing the digital data, and simultaneously and remotely detecting the processed data to determined the occurrence of at least one predetermined condition.

The method can also advantageously include remotely communicating the processed digital data. The step of remotely communicating the processed digital data preferably includes transmitting the processed digital data by the use of an RF transmitter 29 and receiving the transmitted RF data prior to the step of simultaneously and remotely detecting.

The method additionally can include storing the processed digital data until remotely accessed, storing the unprocessed digital data until remotely accessed and displaying processed and unprocessed digital data after being remotely accessed, operatively sampling the plurality of sensors and analyzing the processed digital data at predetermined scripted real time intervals, and operatively generating a data report and generating an alarm condition when predetermined threshold conditions occur.

The method can further advantageously include generating a data communications protocol having the processed digital data and communicating the data communications protocol having the processed digital data responsive to remote access and managing the relatively low amount of power required to process the digital data.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. An apparatus for monitoring a device, the apparatus comprising:

- a plurality of sensors positioned to sense a plurality of parameters including at least shock and vibration and to provide a corresponding plurality of sensor data signals representative of the plurality of monitored parameters wherein at least one sensor has a saturation point which is below the value of an expected parameter;
- low-power data acquisition processing means responsive to the plurality of sensor signals for acquiring and processing the sensed data, said low-power, data acquisition processing means including:
- a plurality of data inputs,
- analog-to-digital converting means responsive to the plurality of data inputs for converting each of the plurality of sensor signals from an analog format to a digital format,
- digital signal processing means responsive to said analog-to-digital converting means for processing the digitally formatted data, wherein said digital signal processing means includes a memory portion, and wherein said memory portion includes projecting means for projecting the value of the sensed data when at least one sensor exceeds its saturation point,
- data communications processing means responsive to said digital signal processing means for generating and processing data communications, said data communications processing means including transmitting and receiving means for transmitting and receiving communications data,
- a portable power source for providing portable power to said data acquisition processing means, and
- power management controlling means at least connected to said portable power source, said digital signal processing means, and said data communications processing means for controlling power management of said data acquisition processing means; and
- a remote data communications detector responsive to said data acquisition processing means for remotely detecting the processed digital data.

2. An apparatus as defined in claim 1, at least one wake-up sensor circuit connected to the low-power, data acquisition processing circuit for sensing an initial wake-up condition to thereby wake-up the low-power, data acquisition processing means from a sleep-type low power condition.

3. A An apparatus as defined in claim 2, wherein said at least one wake-up sensor circuit includes a wake-up sensor for providing a sensing signal responsive to a wake-up condition, a buffer circuit connected to the wake-up sensor for providing a buffered sensing signal, and a threshold detecting circuit connected to said buffer circuit for detecting when a buffered sensing signal reaches a predetermined threshold to thereby provide a wake-up signal to the low-power, data acquisition processing means.

4. An apparatus as defined in claim 3, wherein the plurality of sensors further sense at least one of the following: temperature, strain, humidity, acoustic, angle, magnetic field, seismic, chemical content and/or variation, and tilt.

5. An apparatus as defined in claim 4, wherein the plurality of data inputs includes at least 16 data inputs connected to the analog-to-digital converter.

6. An apparatus as defined in claim 5, wherein the at least 16 data inputs comprises at least 24 data inputs connected to the analog-to-digital converter.

7. An apparatus as defined in claim 6, wherein the combination of said power management controlling means and the type of said portable power source combine to provide means for extending the life of said portable power source during normal system operational use for at least an estimated four-year life and so that said data acquisition processing means operatively draws less than 1 ampere of current, and wherein said power management controlling means includes at least a sleep mode, an ultra-low power awake mode, and a low-power awake mode.

8. An apparatus as defined in claim 7, wherein said data processing circuit further includes at least one RF transmitter for transmitting RF data communications from said data processing circuit, and wherein said remote detector includes an RF receiver for receiving RF data communications from said data processing circuit.

9. An apparatus as defined in claim 8, wherein at least one of said plurality of sensors each comprises a micro-electrical mechanical sensor, and wherein at least one of the plurality of micro-electrical mechanical sensors includes at least one accelerometer.

10. An apparatus as defined in claim 9, wherein said data communications processing means of said data acquisition processing means comprises at least one micro-controller, and wherein said digital acquisition processing means further includes data storing means connected to said digital signal processing means and said at least one micro-controller for storing the processed data therein until remotely accessed by said remote detector.

11. An apparatus as defined in claim 10, wherein said micro-controller further monitors said digital signal processing means before and after said digital signal processing means processes the digital converted data.

12. An apparatus as defined in claim 11, further comprising at least one computer responsive to said remote detector, said at least one computer including a display for displaying unprocessed and processed data from said data acquisition processing means.

13. An apparatus as defined in claim 12, wherein said data acquisition processing circuit further includes at least one RF transmitting circuit responsive to said micro-controller for transmitting RF data communications, and at least one RF receiving circuit connected to said micro-controller for receiving RF data communications, and wherein said micro-controller, said at least one RF transmitting circuit, and said RF receiving circuit define at least portions of a wireless local area network circuit.

14. An apparatus as defined in claim 13, wherein said data acquisition processing means further includes real time clocking means for providing real time thereto, and wherein said power management controlling means is responsive to command signals from said data communications processing means at predetermined real time intervals to increase power supplied to said data acquisition processing means.

15. An apparatus as defined in claim 14, wherein said data storing means of said data acquisition processing means includes script operating means responsive to said real time clocking means for operatively sampling said plurality of data inputs, processing the digital data, and analyzing the processed data at predetermined scripted real time intervals.

16. An apparatus as defined in claim 15, wherein said script operating means further operatively generates a data report and generates an alarm condition when predetermined threshold conditions occur.

17. An apparatus as defined in claim 16, further comprising an image sensor connected to said data acquisition processing means for sensing images.

18. An apparatus as defined in claim 17, further comprising a single, compact, and rugged housing having said data acquisition processing means positioned entirely therein for withstanding harsh environmental conditions.

19. An apparatus for monitoring a device the apparatus comprising:

a plurality of sensors positioned to sense a plurality of parameters including at least shock and vibration and to provide a corresponding plurality of sensor data signals representative of the plurality of monitored parameters wherein at least one sensor has a saturation point which is below the value of an expected parameter;

low-power data acquisition processing means responsive to the plurality of sensor signals for acquiring and processing the sensed data, said low-power, data acquisition processing means including:

a plurality of data inputs, analog-to-digital converting means responsive to the plurality of data inputs for converting each of the plurality of sensor signals from an analog format to a digital format, and digital signal processing means responsive to said analog-to-digital converting means for processing the digitally formatted data, wherein said digital signal processing means includes a memory portion, and wherein said memory portion includes projecting means for projecting the value of the sensed data when at least one sensor exceeds its saturation point, at least one wake-up sensor circuit connected to the low-power, data acquisition processing means for sensing an initial wake-up condition to thereby wake-up the low-power, data acquisition processing means form a sleep-type low power condition; and a data communications interface responsive to said data acquisition processing means for providing data communications from said data acquisition processing means, said data communications interface including transmitting and receiving means for transmitting and receiving communications data.

20. An apparatus as defined in claim 19, wherein said at least one wake-up sensor circuit includes a wake-up sensor for providing a sensing signal responsive to a wake-up condition, a buffer circuit connected to the wake-up sensor for providing a buffered sensing signal, and a threshold detecting circuit connected to said buffer circuit for detecting when a buffered sensing signal reaches a predetermined threshold to thereby provide a wake-up signal to the low-power, data acquisition processing means.

21. An apparatus as defined in claim 20, wherein said data acquisition processing means further includes data communications processing means responsive to said digital signal processing means for generating and processing data communications, a portable power source for providing portable power to said data acquisition processing means, and power management controlling means at least connected to said portable power source, said digital signal processing means, and said data communications processing means for controlling power management of said data acquisition processing means.

22. An apparatus as defined in claim 21, wherein the plurality of sensors further sense at least one of the following: temperature, strain, humidity, acoustic, angle, magnetic field, seismic, chemical content and/or variation, and tilt.

23. An apparatus as defined in claim 22, wherein the plurality of data inputs includes at least 16 data inputs connected to the analog-to-digital converter.

24. An apparatus as defined in claim 23, wherein the combination of said power management controlling means and the type of said portable power source combine to provide means for extending the life of said portable power source during normal system operational use for at least an estimated four-year life and so that said data acquisition processing means operatively draws less than 200 milliamperes of current, and wherein said power management controlling means includes at least a sleep mode, an ultra-low power awake mode, and a low-power awake mode.

25. An apparatus as defined in claim 24, wherein said data processing circuit further includes at least one RF transmitter for transmitting RF data communications from said data processing circuit, and wherein said remote detector includes an RF receiver for receiving RF data communications from said data processing circuit.

26. An apparatus as defined in claim 25, wherein at least one of said plurality of sensors each comprises a micro-electrical mechanical sensor, and wherein at least one of the plurality of micro-electrical mechanical sensors includes at least one accelerometer.

27. An apparatus as defined in claim 26, wherein said data communications processing means of said data acquisition processing means comprises at least one micro-controller, and wherein said digital acquisition processing means further includes data storing means connected to said digital signal processing means and said at least one micro-controller for storing the processed data therein until remotely accessed by said remote detector.

28. An apparatus as defined in claim 27, wherein said data acquisition processing means further includes real time clocking means for providing real time thereto, and wherein said power management controlling means is responsive to command signals from said data communications processing means at predetermined real time intervals to increase power supplied to said data acquisition processing means.

29. An apparatus as defined in claim 28, wherein said data storing means of said data acquisition processing means includes script operating means responsive to said real time clocking means for operatively sampling said plurality of data inputs, processing the digital data, and analyzing the processed data at predetermined scripted real time intervals.

30. An apparatus as defined in claim 29, wherein said script operating means further operatively generates a data report and generates an alarm condition when predetermined threshold conditions occur.

31. An apparatus as defined in claim 30, further comprising a single, compact, and rugged housing having said data acquisition processing means positioned entirely therein for withstanding harsh environmental conditions.

* * * * *